(12) United States Patent
Smith

(10) Patent No.: US 12,441,271 B1
(45) Date of Patent: Oct. 14, 2025

(54) PADDED SHIELD FOR VEHICLE HITCHES

(71) Applicant: Bobby Smith, Washington, NC (US)

(72) Inventor: Bobby Smith, Washington, NC (US)

( * ) Notice: Subject to any disclaimer, the term of this patent is extended or adjusted under 35 U.S.C. 154(b) by 482 days.

(21) Appl. No.: 18/075,482

(22) Filed: Dec. 6, 2022

(51) Int. Cl.
*B60D 1/58* (2006.01)
*B60R 21/34* (2011.01)

(52) U.S. Cl.
CPC ............... *B60R 21/34* (2013.01); *B60D 1/58* (2013.01)

(58) Field of Classification Search
CPC .................................. B60R 21/34; B60D 1/58
See application file for complete search history.

(56) References Cited

U.S. PATENT DOCUMENTS

| | | | |
|---|---|---|---|
| 2,671,675 A * | 3/1954 | Swaisgood ............ | B60D 1/605 280/507 |
| 5,533,743 A | 7/1996 | Bello | |
| 5,564,359 A * | 10/1996 | Harder .................... | B60R 21/34 116/28 R |
| D422,951 S * | 4/2000 | Everett ........................ | D12/162 |
| 6,322,094 B1 * | 11/2001 | Poe .......................... | B60D 1/60 D12/162 |
| 6,412,806 B1 | 7/2002 | Peacock | |
| D480,027 S * | 9/2003 | Collier .......................... | D12/169 |
| D490,348 S * | 5/2004 | Cavey .......................... | D12/162 |
| 6,832,775 B1 | 12/2004 | Muller | |
| 6,851,692 B2 * | 2/2005 | Mitchell ................... | B60R 3/00 280/164.2 |
| 6,938,912 B1 | 9/2005 | Norton | |
| D568,216 S | 5/2008 | Weymouth | |
| 10,384,500 B2 | 8/2019 | Birch | |
| 2005/0093272 A1 | 5/2005 | Adams | |
| 2012/0235383 A1 | 9/2012 | Hanes, Jr. | |

FOREIGN PATENT DOCUMENTS

CA 1309118 10/1992

* cited by examiner

*Primary Examiner* — Valentin Neacsu
*Assistant Examiner* — Marlon A Arce

(57) ABSTRACT

The padded shield for vehicle hitches comprises a shield, a bottom bracket, and a mounting bracket. The padded shield for vehicle hitches may be adapted to prevent personal injury of a person walking past a vehicle. Specifically, the padded shield for vehicle hitches may be adapted to prevent the person from injuring a leg due to contact with a trailer hitch. The shield may project from the rear of the padded shield for vehicle hitches and may prevent the leg from contacting a ball mount. The shield may be padded such that contact between the leg and the shield 200 not cause an injury. The bottom bracket may couple the shield to the mounting bracket. The mounting bracket may removably couple to a receiver tube to suspend the padded shield for vehicle hitches from the trailer hitch.

17 Claims, 6 Drawing Sheets

PADDED SHIELD FOR VEHICLE HITCHES

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of vehicle towing hitch accessories, more specifically, a padded shield for vehicle hitches.

SUMMARY OF INVENTION

The padded shield for vehicle hitches comprises a shield, a bottom bracket, and a mounting bracket. The padded shield for vehicle hitches may be adapted to prevent personal injury of a person walking past a vehicle. Specifically, the padded shield for vehicle hitches may be adapted to prevent the person from injuring a leg due to contact with a trailer hitch. The shield may project from the rear of the padded shield for vehicle hitches and may prevent the leg from contacting a ball mount. The shield may be padded such that contact between the leg and the shield 200 not cause an injury. The bottom bracket may couple the shield to the mounting bracket. The mounting bracket may removably couple to a receiver tube of hitch to suspend the padded shield for vehicle hitches from the trailer hitch.

An object of the invention is to prevent injury from a ball mount of a vehicle hitch.

Another object of the invention is to provide a shield that extends past the ball mount to guard against contact with the ball mount.

A further object of the invention is to suspend the invent from the shank of the ball mount by a mounting bracket.

Yet another object of the invention is to couple the shield to the mounting bracket via a bottom bracket.

These together with additional objects, features and advantages of the padded shield for vehicle hitches will be readily apparent to those of ordinary skill in the art upon reading the following detailed description of the presently preferred, but nonetheless illustrative, embodiments when taken in conjunction with the accompanying drawings.

In this respect, before explaining the current embodiments of the padded shield for vehicle hitches in detail, it is to be understood that the padded shield for vehicle hitches is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the padded shield for vehicle hitches.

It is therefore important that the claims be regarded as including such equivalent construction insofar as they do not depart from the spirit and scope of the padded shield for vehicle hitches. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
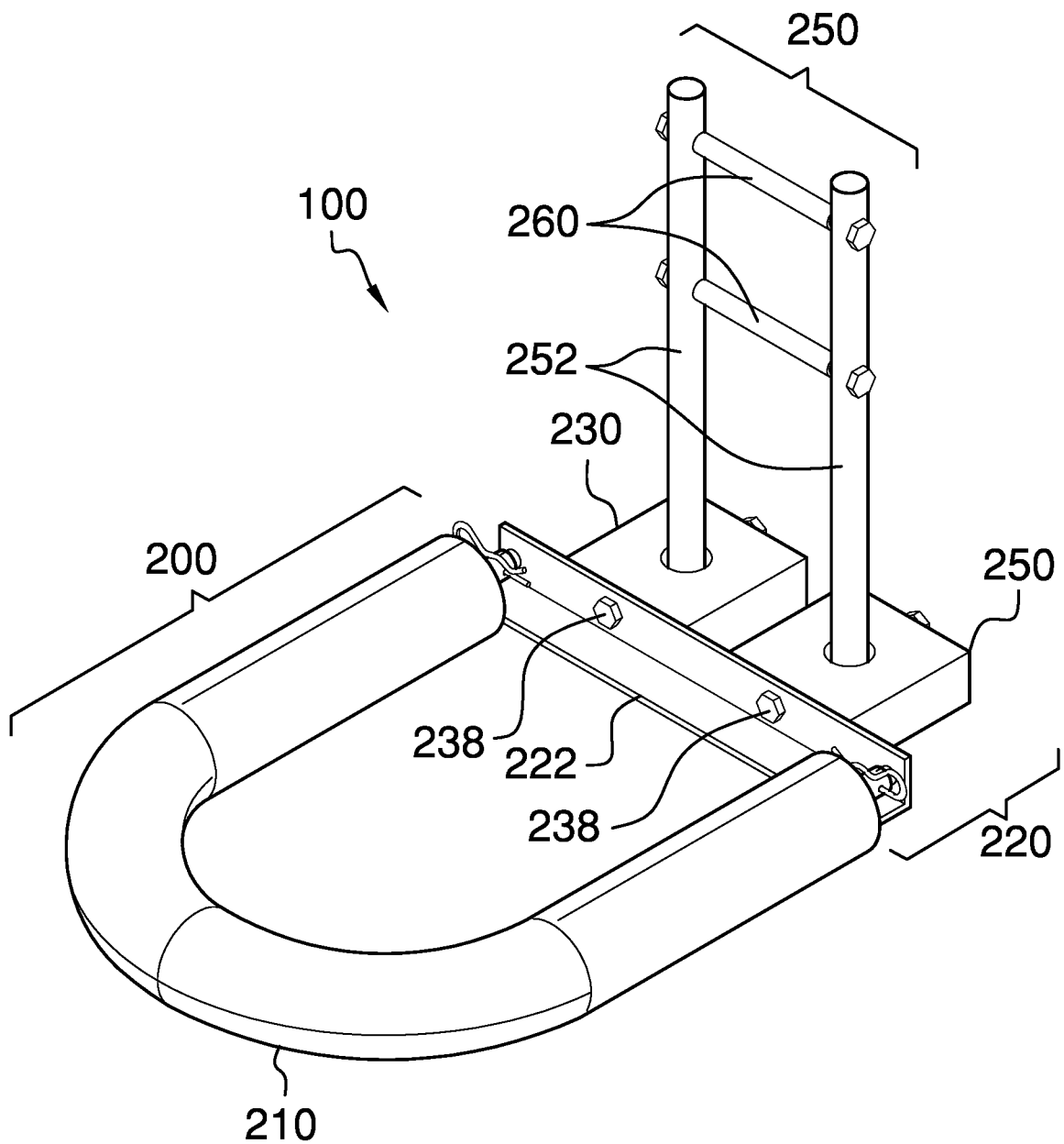
FIG. 1 is an isometric view of an embodiment of the disclosure.
Figure 2:
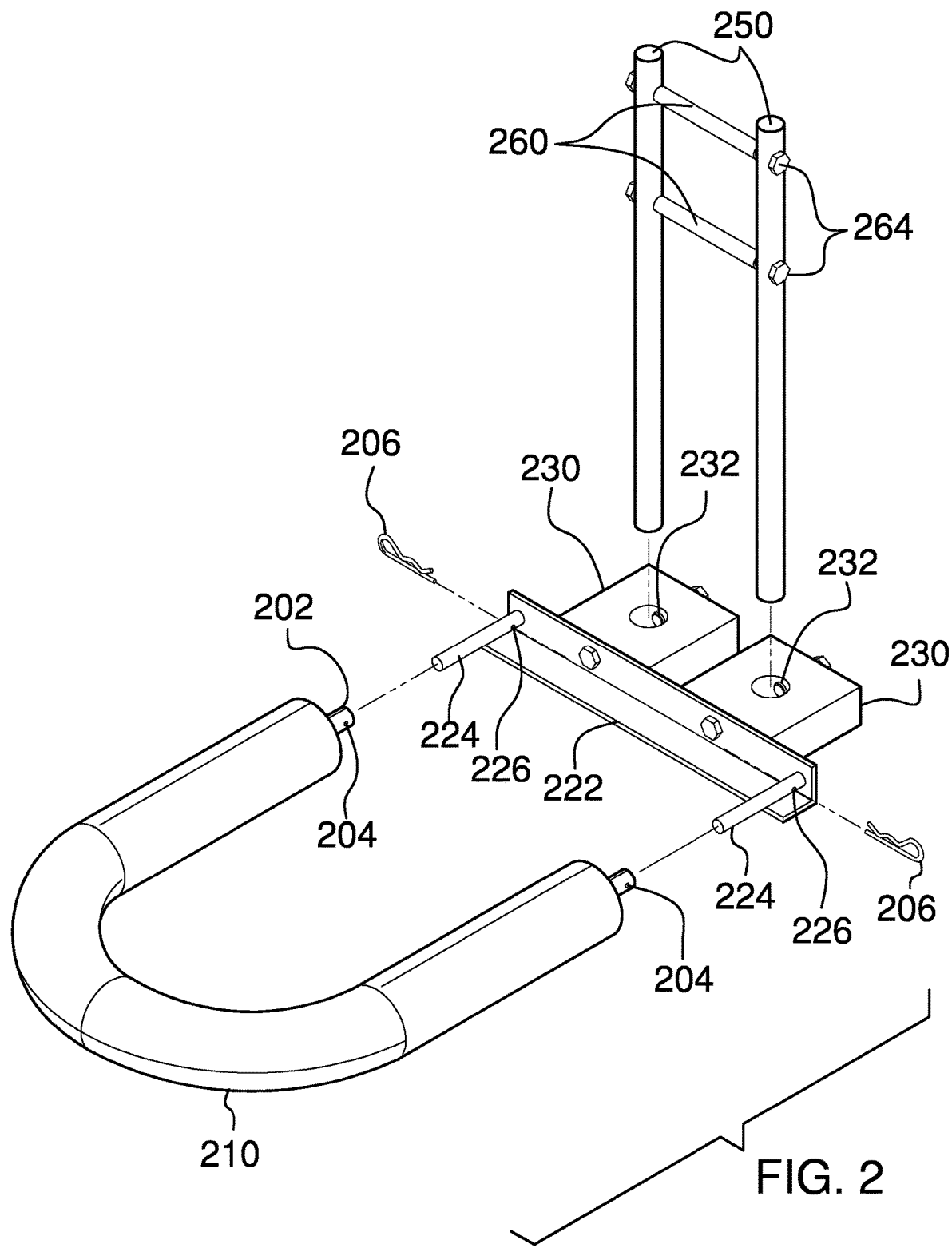
FIG. 2 is an exploded isometric view of an embodiment of the disclosure.
Figure 3:
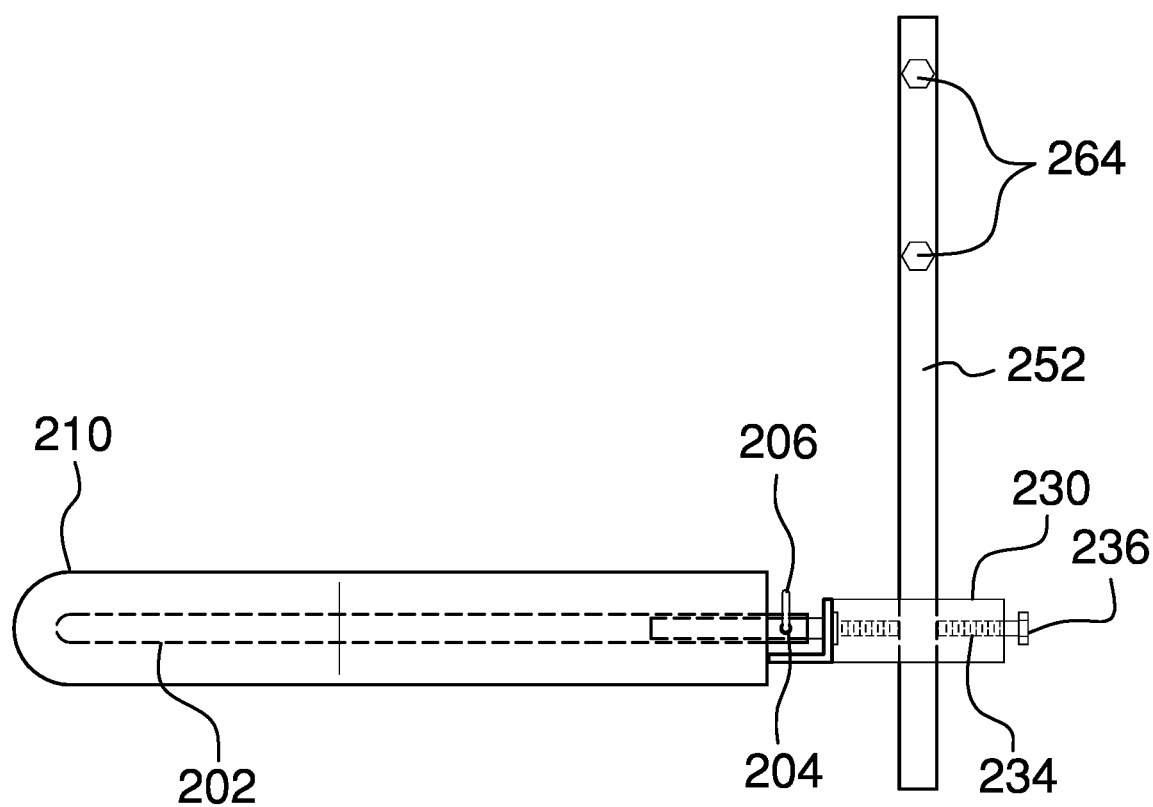
FIG. 3 is a side view of an embodiment of the disclosure.
Figure 4:
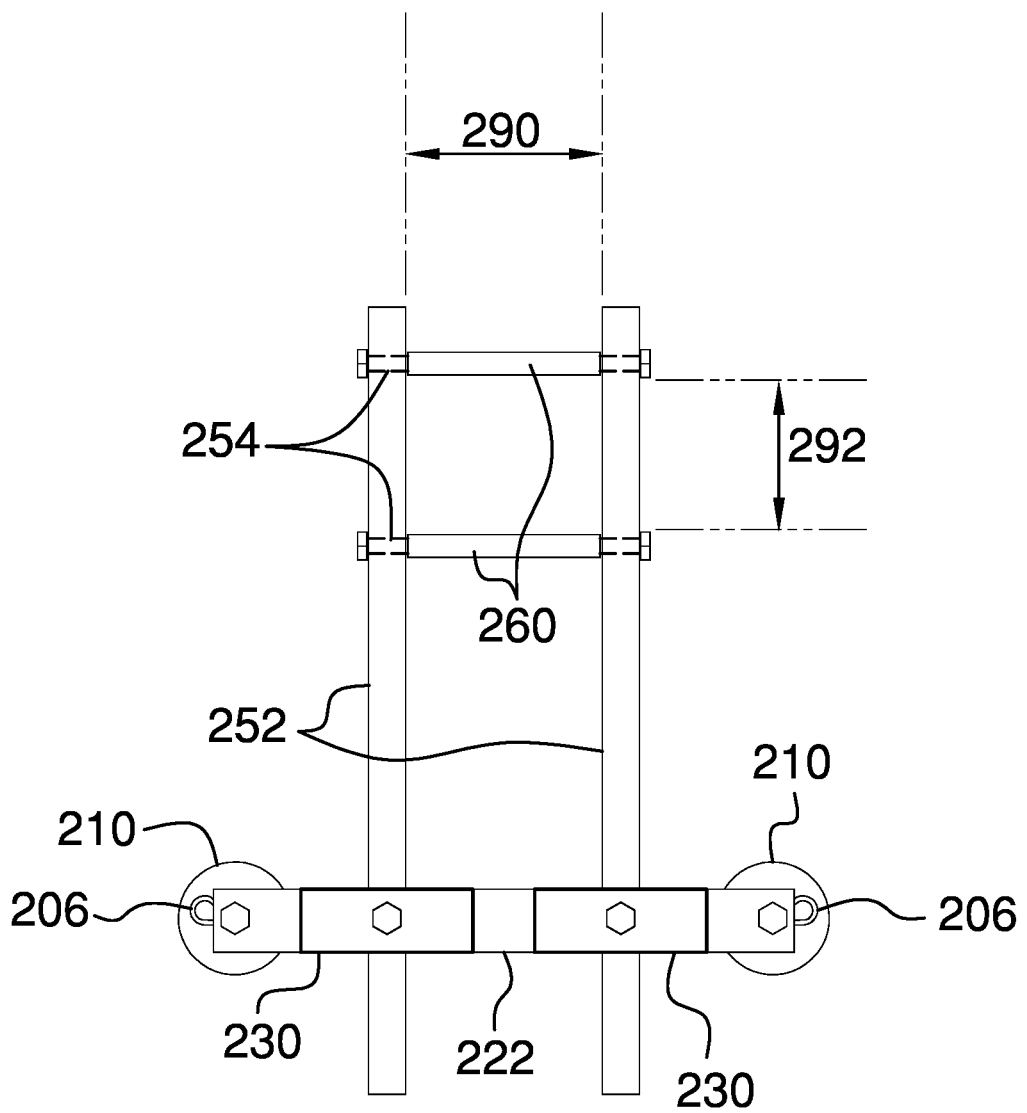
FIG. 4 is a front view of an embodiment of the disclosure.
Figure 5:
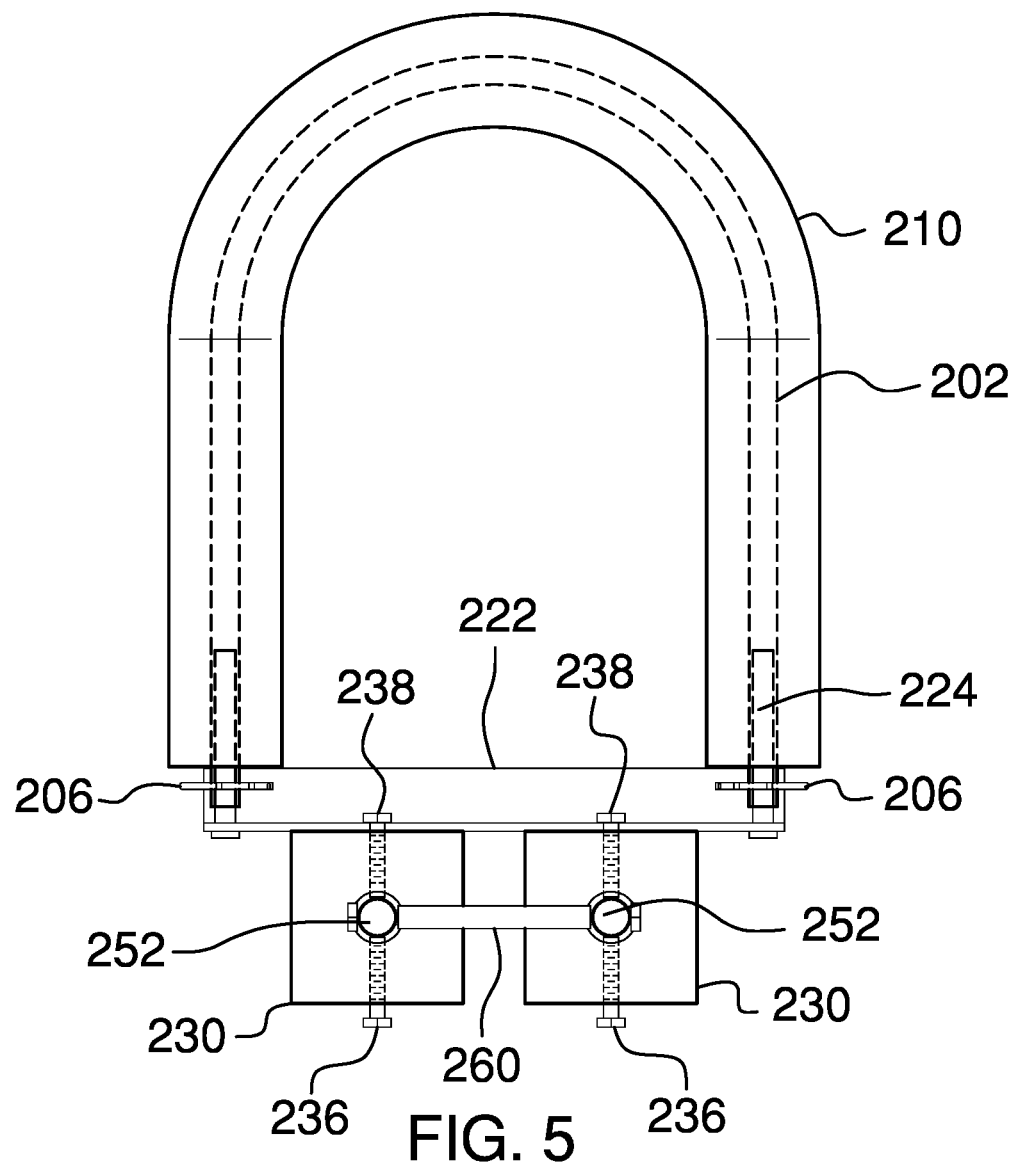
FIG. 5 is a top view of an embodiment of the disclosure.
Figure 6:
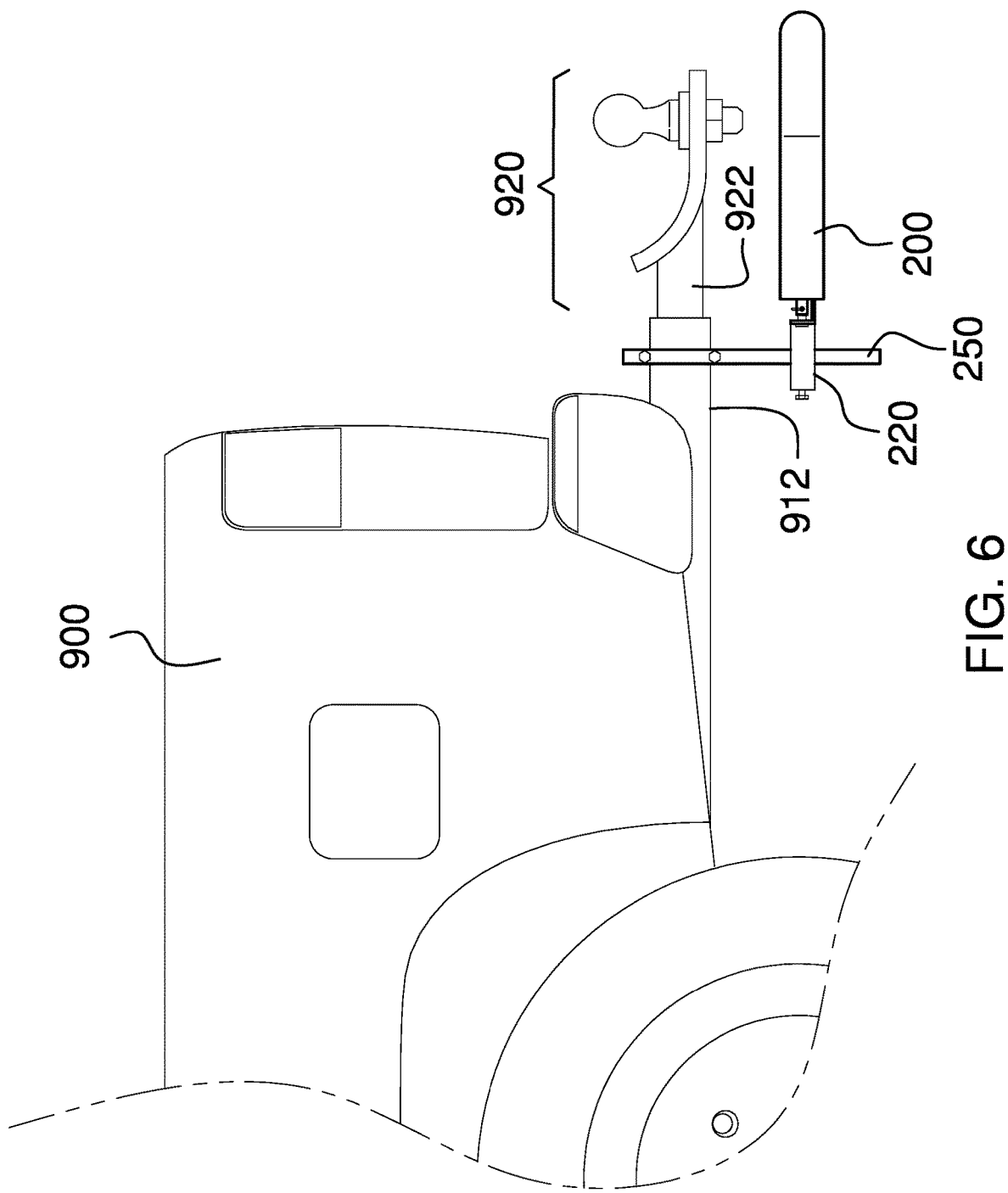
FIG. 6 is an in-use view of an embodiment of the disclosure.

Detailed reference will now be made to a first potential embodiment of the disclosure, which is illustrated in FIGS. 1 through 6.

The padded shield for vehicle hitches 100 (hereinafter invention) comprises a shield 200, a bottom bracket 220, and a mounting bracket 250. The invention 100 may be adapted to prevent personal injury of a person walking past a vehicle 900. Specifically, the invention 100 may be adapted to prevent the person from injuring a leg due to contact with a trailer hitch. The shield 200 may project from the rear of the invention 100 and may prevent the leg from contacting a ball mount 920. The shield 200 may be padded such that contact between the leg and the shield 200 does not cause an injury. The bottom bracket 220 may couple the shield 200 to the mounting bracket 250. The mounting bracket 250 may removably couple to a receiver 912 of a vehicle hitch to suspend the invention 100 from the trailer hitch.

The shield 200 may comprise a shield armature 202 that may be held in a horizontal orientation. The shield armature 202 may be U-shaped with the straight ends of the U pointed towards the vehicle 900 and the rounded portion of the U pointed away from the vehicle 900. The shield armature 202 may be hollow. The shield armature 202 may have a lateral footprint that is wider than the ball mount 920 such that the shield armature 202 extends laterally to both sides of the ball mount 920 and guards the ball mount 920 from contact on either side of the ball mount 920. The shield armature 202 may extend rearward farther than the ball mount 920 such that the ball mount 920 is guarded from rear contact. The shield armature 202 is not required to be in the same horizontal plane as the ball mount 920. In some embodiments, the shield armature 202 may be positioned lower than the ball mount 920.

The shield armature 202 may comprise a pair of pin apertures 204 that may be located on the straight ends of the shield armature 202. The pair of pin apertures 204 may be horizontally oriented. The pair of pin apertures 204 may be operable to removably couple the shield 200 to the bottom bracket 220.

The shield armature 202 may comprise padding 210 to cover the outer surface of the shield armature 202. The padding 210 may be a hollow foam tube that slides onto the shield armature 202 in order to cushion the shield armature 202. The padding 210 may be removable and replaceable. The color of the padding 210 may be selectable from a plurality of colors. In some embodiments, the padding 210 may comprise indicia. As a non-limiting example, the indicia may comprise a logo.

The bottom bracket 220 may couple the shield 200 to the mounting bracket 250. The bottom bracket 220 may orient the shield 200 horizontally. The bottom bracket 220 may orient the mounting bracket 250 vertically. The bottom bracket 220 may comprise a lateral armature 222 and a pair of bottom blocks 230.

The lateral armature 222 may be a laterally-oriented horizontal armature comprising a pair of shield posts 224. The pair of shield posts 224 may be oriented to point rearward—away from the vehicle 900. The outside diameter of the pair of shield posts 224 may be smaller than the inside diameter of the straight ends of the shield armature 202. The spacing between the pair of shield posts 224 may match the spacing between the straight ends of the shield armature 202. The shield armature 202 may be coupled to the bottom bracket 220 by sliding the straight ends of the shield armature 202 over the pair of shield posts 224.

The pair of shield posts 224 may comprise shield post apertures 226. The shield post apertures 226 may align with the pair of pin apertures 204 when the shield armature 202 is positioned on the pair of shield posts 224. The shield armature 202 may be retained on the bottom bracket 220 by passing a pair of retention pins 206 through the shield armature 202 and the pair of shield posts 224 via the pair of pin apertures 204 and the shield post apertures 226.

The pair of bottom blocks 230 may be coupled to the lateral armature 222 such that the pair of bottom blocks 230 are positioned forward of the lateral armature 222—between the lateral armature 222 and the vehicle 900. Each of the pair of bottom blocks 230 may comprise a bottom block aperture 232. The bottom block apertures 232 may extend through the pair of bottom blocks 230 from top to bottom. The mounting bracket 250 may couple to the pair of bottom blocks 230 via the bottom block apertures 232.

An individual bottom block selected from the pair of bottom blocks 230 may comprise a height adjuster aperture 234 that may pass horizontally from the front side of the individual bottom block into the bottom block aperture 232. The height adjuster aperture 234 may be threaded to accept a height adjuster screw 236.

In some embodiments, the pair of bottom blocks 230 may be coupled to the lateral armature 222 via one or more block screws 238. Alternatively, the pair of bottom blocks 230 and the lateral armature 222 may be welded together.

In some embodiments, the pair of bottom blocks 230, the lateral armature 222, or any combination thereof may be made from a single piece of material.

The mounting bracket 250 may removably couple the invention 100 to the receiver tube 912. The mounting bracket 250 may comprise a pair of vertical armatures 252 and a pair of horizontal armatures 260. The pair of vertical armatures 252 may be vertically-oriented parallel armatures. A horizontal clearance distance 290 between the pair of vertical armatures 252 may be at least as large as the horizontal width of the shank 922 on the ball mount 920. The horizontal clearance distance 290 between the pair of vertical armatures 252 may align the pair of vertical armatures 252 with the bottom block apertures 232 on the bottom bracket 220. The horizontal clearance distance 290 may be determined by the length of the pair of horizontal armatures 260. The mounting bracket 250 may be coupled to the bottom bracket 220 by inserting the bottom ends of the pair of vertical armatures 252 into the bottom block apertures 232 and tightening the height adjuster screws 236.

The pair of horizontal armatures 260 may be horizontally-oriented parallel armatures. A vertical clearance distance 292 between the pair of horizontal armatures 260 may be at least as large as the vertical height of the shank 922 on the ball mount 920. The vertical clearance distance 292 between the pair of horizontal armatures 260 may be determined by the spacing between a pair of mounting apertures 254 located on the pair of vertical armatures 252. The ends of an individual horizontal armature selected from the pair of horizontal armatures 260 may be threaded to accept a pair of mounting screws 264. The pair of horizontal armatures 260 may be coupled between the pair of vertical armatures 252 by passing the pair of mounting screws 264 through the pair of vertical armatures 252 and into the ends of the pair of horizontal armatures 260. The pair of vertical armatures 252 and the pair of horizontal armatures 260 may encompass the receiver tube 912 of the vehicle hitch, which is adjacent to the ball mount 920. Moreover, the receiver tube 912 supports the mounting bracket 250.

The height of the shield 200 may be adjusted by loosening the height adjuster screws 236, moving the bottom bracket 220 up or down, and tightening the height adjuster screws 236.

In use, the invention 100 may be installed on the trailer hitch by passing the receiver tube 912 of the hitch through the mounting bracket 250. The receiver tube 912 must pass between the pair of vertical armatures 252 and between the pair of horizontal armatures 260 of the mounting bracket 250. The mounting bracket 250 may hang down from the receiver tube 912 and the shield 200 may extend rearward to prevent contact with the ball mount 920. The height of the shield 200 may be adjusted by loosening the height adjuster screws 236, sliding the shield 200 up or down, and tightening the height adjuster screws 236.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used herein, "align" may refer to the placement of two or more components into positions and orientations which either arranges the components along a straight line or within the same plane or which will allow the next step of assembly to proceed.

As a non-limiting example, the next step of assembly may be to insert one component into another component, requiring alignment of the components.

As used in this disclosure, an "aperture" may be an opening in a surface or object. Aperture may be synonymous with hole, slit, crack, gap, slot, or opening.

As used herein, a "ball mount" may be a device that mates with a hitch receiver and presents a hitch ball as part of a ball hitch. In its simplest form, a ball mount may be a square or rectangular piece of metal tubing with a hitch ball mounted on one end and a pair of opposing holes in the opposite end. The ball mount slides into the hitch received and is held in place by a pin and lock and the hitch ball extends vertically upwards from the exposed end of the tubing.

As used herein, the words "couple", "couples", "coupled" or "coupling", may refer to connecting, either directly or indirectly, and does not necessarily imply a mechanical connection.

As used here, "footprint" may refer to a projection of an object onto the surface that supports the object. The projection is usually, but not always, vertically downward.

As used herein, "front" may indicate the side of an object that is closest to a forward direction of travel under normal use of the object or the side or part of an object that normally presents itself to view or that is normally used first. "Rear" or "back" may refer to the side that is opposite the front.

As used in this disclosure, a "hitch" may be a fastening apparatus that attaches an unpowered vehicle to a motorized vehicle such that the motorized vehicle can tow the unmotorized vehicle.

As used in this disclosure, "horizontal" may be a directional term that refers to a direction that is perpendicular to the local force of gravity. Unless specifically noted in this disclosure, the horizontal direction is always perpendicular to the vertical direction.

As used in this disclosure, the term "indicia" may refer to a set of markings that identify a sentiment.

As used herein, "inside diameter" or "inner diameter" may refer to a measurement made on a hollow object. Specifically, the inside diameter is the distance from one inside wall to the opposite inside wall.

As used in this disclosure, the word "lateral" may refer to the sides of an object or movement towards a side. Lateral directions are generally perpendicular to longitudinal directions. "Laterally" may refer to movement in a lateral direction.

As used in this disclosure, a "logo" may be artwork that is typically associated with an organization, brand, or activity. The logo may be textual, graphical, or both.

As used in this disclosure, "orientation" may refer to the positioning and/or angular alignment of a first object relative to a second object or relative to a reference position or reference direction.

As used herein, "outside diameter" or "outer diameter" may refer to a measurement made on an object. Specifically, the outside diameter is the distance from one point on the outside of the object to a point on the opposite side of the object along a line passing through the center of the object.

As used in this disclosure, "vertical" may refer to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A padded shield for vehicle hitches comprising:
   a shield, a bottom bracket, and a mounting bracket;
   wherein the padded shield for vehicle hitches is adapted to prevent personal injury of a person walking past a vehicle;
   wherein the padded shield for vehicle hitches is adapted to prevent the person from injuring a leg due to contact with a trailer hitch;
   wherein the shield projects from a rear of the trailer hitch and is adapted to prevent a leg from contacting a ball mount;
   wherein the shield is padded;
   wherein the bottom bracket couples the shield to the mounting bracket;
   wherein the mounting bracket removably couples to a shank of the ball mount to suspend the padded shield for vehicle hitches from the trailer hitch;
   wherein the shield comprises a shield armature that is held in a horizontal orientation;
   wherein the shield armature is U-shaped with the straight ends of the U pointed towards the vehicle and the rounded portion of the U pointed away from the vehicle;
   wherein the shield armature is hollow and has a lateral footprint that is wider than the ball mount such that the shield armature extends laterally to both sides of the ball mount and guards the ball mount from contact on either side of the ball mount;
   wherein the shield armature extends rearward farther than the ball mount such that the ball mount is guarded from rear contact;
   wherein the shield armature is positioned lower than the ball mount.

2. The padded shield for vehicle hitches according to claim 1
   wherein the shield armature comprises a pair of pin apertures that are located on the straight ends of the shield armature;
   wherein the pair of pin apertures are horizontally oriented;
   wherein the pair of pin apertures are operable to removably couple the shield to the bottom bracket.

3. The padded shield for vehicle hitches according to claim 2
   wherein the shield armature comprises padding to cover the outer surface of the shield armature;

wherein the padding is a hollow foam tube that slides onto the shield armature in order to cushion the shield armature;

wherein the padding is removable and replaceable.

4. The padded shield for vehicle hitches according to claim 3 wherein the padding comprises indicia.

5. The padded shield for vehicle hitches according to claim 4 wherein the indicia comprises a logo.

6. The padded shield for vehicle hitches according to claim 3 wherein the bottom bracket couples the shield to the mounting bracket;

wherein the bottom bracket orients the shield horizontally;

wherein the bottom bracket orients the mounting bracket vertically;

wherein the bottom bracket comprises a lateral armature and a pair of bottom blocks.

7. The padded shield for vehicle hitches according to claim 6 wherein the lateral armature is a laterally-oriented horizontal armature comprising a pair of shield posts;

wherein the pair of shield posts are oriented to point rearward;

wherein the outside diameter of the pair of shield posts is smaller than the inside diameter of the straight ends of the shield armature;

wherein a spacing between the pair of shield posts matches the spacing between the straight ends of the shield armature;

wherein the shield armature is coupled to the bottom bracket by sliding the straight ends of the shield armature over the pair of shield posts.

8. The padded shield for vehicle hitches according to claim 7 wherein the pair of shield posts comprise shield post apertures;

wherein the shield post apertures align with the pair of pin apertures when the shield armature is positioned on the pair of shield posts;

wherein the shield armature is retained on the bottom bracket by passing a pair of retention pins through the shield armature and the pair of shield posts via the pair of pin apertures and the shield post apertures.

9. The padded shield for vehicle hitches according to claim 8 wherein the a pair of bottom blocks are coupled to the lateral armature such that the pair of bottom blocks are positioned forward of the lateral armature;

wherein each of the pair of bottom blocks comprises a bottom block aperture;

wherein the bottom block apertures extend through the pair of bottom blocks from top to bottom;

wherein the mounting bracket couples to the pair of bottom blocks via the bottom block apertures.

10. The padded shield for vehicle hitches according to claim 9 wherein an individual bottom block selected from the pair of bottom blocks comprises a height adjuster aperture that passes horizontally from the front side of the individual bottom block into the bottom block aperture;

wherein the height adjuster aperture is threaded to accept a height adjuster screw.

11. The padded shield for vehicle hitches according to claim 10 wherein the mounting bracket removably couples the padded shield for vehicle hitches to the receiver tube;

wherein the mounting bracket comprises a pair of vertical armatures and a pair of horizontal armatures;

wherein the pair of vertical armatures are vertically-oriented parallel armatures;

wherein a horizontal clearance distance between the pair of vertical armatures is at least as large as the horizontal width of the receiver tube;

wherein the horizontal clearance distance between the pair of vertical armatures aligns the pair of vertical armatures with the bottom block apertures on the bottom bracket.

12. The padded shield for vehicle hitches according to claim 11 wherein the horizontal clearance distance is determined by the length of the pair of horizontal armatures.

13. The padded shield for vehicle hitches according to claim 12 wherein the mounting bracket is coupled to the bottom bracket by inserting the bottom ends of the pair of vertical armatures into the bottom block apertures and tightening the height adjuster screws.

14. The padded shield for vehicle hitches according to claim 13 wherein the pair of horizontal armatures are horizontally-oriented parallel armatures;

wherein a vertical clearance distance between the pair of horizontal armatures is at least as large as the vertical height of the shank on the ball mount.

15. The padded shield for vehicle hitches according to claim 14 wherein the vertical clearance distance between the pair of horizontal armatures is determined by the spacing between a pair of mounting apertures located on the pair of vertical armatures.

16. The padded shield for vehicle hitches according to claim 15 wherein the ends of an individual horizontal armature selected from the pair of horizontal armatures are threaded to accept a pair of mounting screws;

wherein the pair of horizontal armatures are coupled between the pair of vertical armatures by passing the pair of mounting screws through the pair of vertical armatures and into the ends of the pair of horizontal armatures;

wherein the pair of vertical armatures and the pair of horizontal armatures encompass the receiver tube such that the receiver tube supports the mounting bracket.

17. The padded shield for vehicle hitches according to claim 16 wherein the height of the shield is adjusted by loosening the height adjuster screws, moving the bottom bracket up or down, and tightening the height adjuster screws.

* * * * *